(12) United States Patent
Perarnau Ramos et al.

(10) Patent No.: US 8,857,584 B2
(45) Date of Patent: Oct. 14, 2014

(54) SHOCK ABSORBING SYSTEM APPLICABLE TO THE BUMPER OF A VEHICLE

(75) Inventors: Francesc Perarnau Ramos, Sabadell (ES); Isabel Garcia Bonilla, Rubi (ES); Antoni Becares Lopez, Santpedor (ES); Martin Antonio Meca Martinez, Callus (ES)

(73) Assignee: Autotech Engineering, AIE, Sant Esteve Ses Rovires (ES)

( * ) Notice: Subject to any disclaimer, the term of this patent is extended or adjusted under 35 U.S.C. 154(b) by 125 days.

(21) Appl. No.: 13/416,355

(22) Filed: Mar. 9, 2012

(65) Prior Publication Data

US 2012/0228073 A1 Sep. 13, 2012

(30) Foreign Application Priority Data

Mar. 10, 2011 (EP) .................................... 11382063

(51) Int. Cl.
*F16F 7/12* (2006.01)
*B60R 19/26* (2006.01)
*B60R 19/34* (2006.01)

(52) U.S. Cl.
CPC ................. *B60R 19/26* (2013.01); *F16F 7/125* (2013.01); *B60R 19/34* (2013.01); *B60R 2019/262* (2013.01)
USPC ...... 188/377; 188/371; 293/133; 296/187.04; 296/118

(58) Field of Classification Search
CPC ............ B62D 21/15; F16F 7/12; F16F 7/003; F16F 7/125; F16F 7/126; B60R 19/34; B60R 19/26; B60R 21/017
USPC .............. 188/371, 377; 293/24–26, 132–137, 293/118; 296/187.04
See application file for complete search history.

(56) References Cited

U.S. PATENT DOCUMENTS

| | | | | |
|---|---|---|---|---|
| 7,475,752 B2* | 1/2009 | Borg et al. | ..................... | 180/274 |
| 7,913,795 B2* | 3/2011 | Borg et al. | ..................... | 180/274 |
| 2005/0151393 A1* | 7/2005 | Borg et al. | ............... | 296/187.09 |
| 2005/0257980 A1* | 11/2005 | Green et al. | ................... | 180/274 |
| 2006/0022473 A1* | 2/2006 | Hansen | ......................... | 293/133 |

FOREIGN PATENT DOCUMENTS

| | | | | |
|---|---|---|---|---|
| DE | 100 02 148 A1 | * | 11/2000 | .............. B60R 19/26 |
| DE | 10002148 A1 | * | 11/2000 | .............. B60R 19/26 |
| DE | 102 57 262 A1 | * | 6/2004 | |
| DE | 10 2006 058 043 A1 | | 6/2008 | |
| EP | 1 486 381 A2 | | 12/2004 | |
| EP | 1 854 676 A2 | | 11/2007 | |
| FR | 2 928 318 A1 | | 9/2009 | |
| WO | WO 2004/113131 A1 | | 12/2004 | |
| WO | WO 2009/063275 A1 | | 12/2004 | |

* cited by examiner

*Primary Examiner* — Thomas Irvin
(74) *Attorney, Agent, or Firm* — Sughrue Mion, PLLC

(57) ABSTRACT

A shock absorbing system applicable to the bumper of a vehicle including a shock absorber with a deformable tube and a retaining device of the absorber including a mechanism susceptible to adopting at least one blocking position and one releasing position in which it prevents and allows, respectively, the displacement of a retaining portion of the absorber in an axial direction. The mechanism includes two rotating retaining connecting rods in a plane perpendicular to the longitudinal axis of the deformable tube, linked to one another such that the rotation of any one of the connecting rods is transmitted to the other to achieve a similar movement but in the opposite direction; and an electromechanical transducer to displace the mechanism from the blocking position to the releasing position.

18 Claims, 2 Drawing Sheets

SHOCK ABSORBING SYSTEM APPLICABLE TO THE BUMPER OF A VEHICLE

TECHNICAL FIELD OF THE INVENTION

The invention relates to a shock absorbing system applicable to the bumper of a vehicle, of the type comprising a shock absorber with a deformable tube linking the bumper with a structural component of the vehicle.

BACKGROUND OF THE INVENTION

A shock absorbing system comprising a plastically deformable tube linking the bumper of a vehicle with a fixed element of its structure or chassis, specifically a beam, is known from patent document WO 2009/063275.

The deformable tube is linked to the beam by means of a retaining device adapted to adopt a blocking position in which it prevents the relative movement between the aforementioned deformable tube and the beam, and a releasing position which allows the displacement of the deformable tube in relation to the aforementioned beam.

This retaining device comprises a pyrotechnic actuator controlled by an electric impulse which upon being triggered allows the retaining device to go from adopting the blocking position to adopting the releasing position almost instantaneously.

For the operation of the system, the vehicle is equipped with the sensing means necessary to discern between a collision with a pedestrian and a collision with any other obstacle, and which in the first case generate an electrical signal for activating the pyrotechnic actuator if certain predetermined conditions generally related to other aspects, such as the speed or instantaneous acceleration of the vehicle, are met.

Consequently, if something or someone is hit and the impact meets pre-established conditions, the sensing means generate an electrical signal which triggers the pyrotechnic actuator and therefore the retaining means adopt the releasing position, allowing displacement of the deformable tube in an axial direction and thereby the displacement of the bumper of the vehicle, it being retracted in the direction towards the inside of the vehicle on impact with the pedestrian, for the purpose of reducing the damages caused.

If a collision occurs with any other obstacle and the previously mentioned conditions are not present, the sensing means do not generate any electrical signal and therefore the retaining means, which adopt their blocking position, prevent the relative movement between the deformable tube and the vehicle chassis. Consequently, due to the effect of the impact, the bumper is displaced in a direction towards the inside of the vehicle but in this case the deformable tube is deformed by absorbing part of the energy of the collision.

Patent documents EP 1854676 and FR 2928318 describe systems similar to that described above.

Patent document WO 2004113131 describes an energy absorbing system also applicable to the bumper of a vehicle comprising a deformable tube and tube retaining means to prevent or allow its displacement with respect to a beam if certain conditions are met. Basically, this system differs from the previous ones in the nature of the sensing means and in the pre-established conditions which must be met so that when the vehicle collides the retaining means go from adopting a blocking position to a releasing position.

All the systems described have in common that the deformable tube is provided with a series of perforations intended to cooperate with retaining bodies that are provided in the retaining device. In the blocking position said retaining bodies penetrate or even traverse the deformable tube through its perforations and thus prevent its displacement in the axial direction. Nevertheless, none of these documents describes any mechanical solution for displacing the retaining bodies from their blocking position to their releasing position almost instantaneously.

An absorbing system, the retaining means of which are simple and effective, forming a self-supporting unit with the actuator and are versatile in the sense that they can function with actuators of a distinct nature, is an objective of the present invention.

In addition, a drawback related to perforated deformable tubes is that these perforations alter the mechanical properties of the deformable tube, and the configuration and arrangement of the retaining bodies, generally in the form of pins which extend in a direction perpendicular to the axis of the deformable tube, entails in practice that the retaining stresses are concentrated in very small areas of the deformable tube, and this causes it to break or bend when a collision occurs, when what is desired is for it to be crushed in an axial direction in the form of a bellows to absorb a maximum amount of energy in the event of a collision. A system which improves the energy absorption capacity in the event of a vehicle collision is therefore another objective of the present invention.

A system that is more economical than the known systems is also a secondary objective of the invention.

DISCLOSURE OF THE INVENTION

The system according to the invention comprises an absorber in a known manner, comprising a deformable tube joined at one of its ends to the element of the vehicle which acts as a bumper, and a retaining device of the aforementioned absorber supported by a vehicle chassis component, such as a beam, comprising a mechanism susceptible to adopting at least one blocking position and one releasing position in which it prevents and allows, respectively, the displacement of a retaining portion of the absorber in an axial direction with respect to the chassis in the event of a vehicle collision.

The system is essentially characterised in that said mechanism comprises two rotating retaining connecting rods in a plane perpendicular to the longitudinal axis of the deformable tube and symmetrically arranged around it, connected to a common support and linked to one another such that the rotation of any one of the connecting rods is transmitted to the other to achieve a similar movement but in the opposite direction, the connecting rods being able to rotate from a blocking position in which they interfere in the path of the absorber preventing the displacement of its retaining portion in the aforementioned axial direction to a releasing position in which they allow the displacement of the absorber with respect to the retaining device and consequently with respect to the chassis; and an electromechanical transducer transforming an electrical signal into a mechanical impulse, connected to the retaining connecting rods for the purpose of transmitting to them, when a predetermined electrical signal is received, an impulse sufficient to displace them from their blocking position to their releasing position almost instantaneously.

According to another feature of the invention, the retaining mechanism comprises a first and a second bar joined by means of respective articulated joints to a corresponding connecting rod, said first and second bars in turn being joined to one another by means of an articulated joint the displacement of which is guided by a slide.

In one embodiment variant, the articulated joints for joining the first and second bars and the corresponding connecting rods are essentially located diametrically opposite with respect to the deformable tube when said connecting rods adopt the blocking position.

The connecting rods of the retaining device are preferably subjected to the action of elastic means which tend to arrange them in the blocking position.

The invention contemplates electromechanical transducer being any one of a pyrotechnic actuator or a magnetorheological actuator.

According to a variant of the invention, the electromechanical transducer comprises a cylinder and piston assembly, of which the cylinder is joined in an articulated manner to one connecting rod and the piston is joined in an articulated manner to the other connecting rod.

According to another feature of the invention, the common support of the connecting rods is formed by a flat bar provided with an opening which is traversed by the deformable tube, said flat bar being pressed along the contour of the opening in the direction of the connecting rods to form a supporting plane thereof.

In one embodiment, the retaining portion of the absorber is made up of an outer ring outside the deformable tube having at least two slits transverse to the deformable tube in which respective retaining portions formed in the inner edge of the connecting rods are tightly inserted.

According to another feature of the invention, the retaining portions formed in the inner edges of the connecting rods have an arced contour, and the interference between each connecting rod and the outer ring spans an angle α comprised between 40° and 90°.

In a particularly interesting embodiment, the end of the absorber opposite to that which is joined to the element which acts as a bumper, is coupled in the mouth of a beam of the vehicle.

In this embodiment, the retaining device comprises a pipe which is introduced into the beam and guides the displacement of the absorber in the direction of introduction into the beam. The pipe is preferably in the shape of a truncated cone or the like.

According to another feature of the invention, the deformable tube is obtained by hydroforming and is devoid of any perforations.

According to a variant of the invention, the deformable tube has a front sector intended to be deformed when subjected to a compressive force; a short intermediate transition sector; and a rear sector coupled inside a beam of a vehicle and having greater width than the previous sector

BRIEF DESCRIPTION OF THE DRAWINGS

The retaining device has been depicted in the attached drawings according to a variant of the invention. Specifically.

DETAILED DESCRIPTION OF A VARIANT OF THE INVENTION

The shock absorbing system object of the invention comprises an absorber linking the bumper of the vehicle with a component of the vehicle structure or chassis such as, for example, a beam, in a known manner. The system is designed to provide at least one pair of said absorbers at both ends of the bumper, aligned with respective beams of the vehicle.

Each of the absorbers is associated with a corresponding retaining device firmly mounted with respect to a beam, comprising a mechanism susceptible to adopting at least one blocking position and one releasing position in which it prevents and allows, respectively, the displacement of a retaining portion of the absorber in an axial direction with respect to the beam in the event of a vehicle collision.

Figure 1:
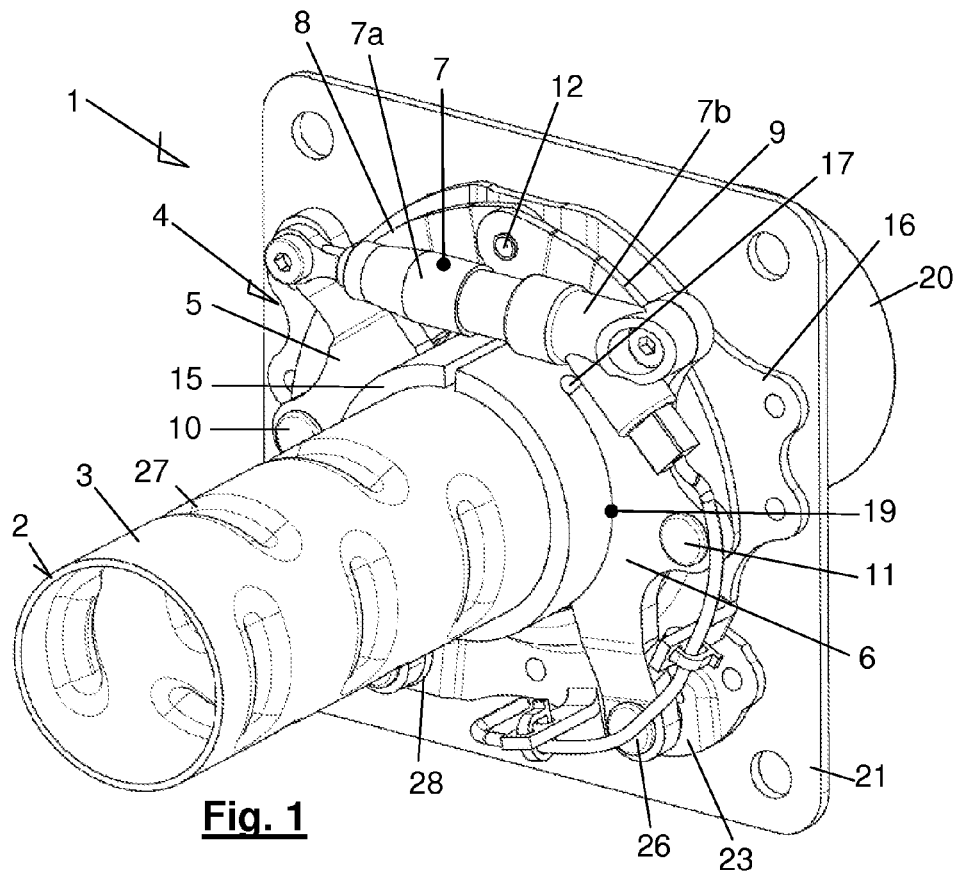
FIG. 1 is a perspective view of the retaining device with the absorber, the retaining device adopting the blocking position.

FIG. 1 shows a variant for a retaining device 4 according to the invention. This retaining device 4 comprises a perforated supporting plate 21 on which there is secured a flat bar 16 provided with an opening 13 through which the absorber 2 of the retaining system 1 can be displaced. As will be explained in detail below, this absorber 2 comprises a deformable tube 3.

This flat bar 16 has two lower pressed forms 22 and 23 in which two rotating connecting rods 5 and 6 are connected in an articulated manner by means of respective articulated joints 25 and 26 in a plane perpendicular to the longitudinal axis of the deformable tube 3 of the absorber 2. These connecting rods 5 and 6, which are symmetrically arranged with respect to the opening 13 of the flat bar 16 and therefore with respect to the absorber 2, are linked to one another by means of a first and a second bar 8 and 9 such that the rotation of any one of the connecting rods 5 and 6 is transmitted to the other to achieve a similar movement but in the opposite direction. To that end, the bars 8 and 9, each joined to a corresponding connecting rod by means of the articulated joints 10 and 11, are joined to one another by means of an articulated joint 12 the displacement of which is guided by a slide 24 (seen in FIG. 4) formed in the flat bar 16. This slide 24 is vertical and equidistant from the joints between the connecting rods 5 and 6 and the flat bar 16.

The retaining device 4 is provided with an electromechanical transducer 7 formed by a pyrotechnic actuator comprising a cylinder 7a and piston 7b assembly, of which the cylinder is joined in an articulated manner to the end of the connecting rod 5 and the piston is joined in an articulated manner to the end of the connecting rod 6.

Figure 2:
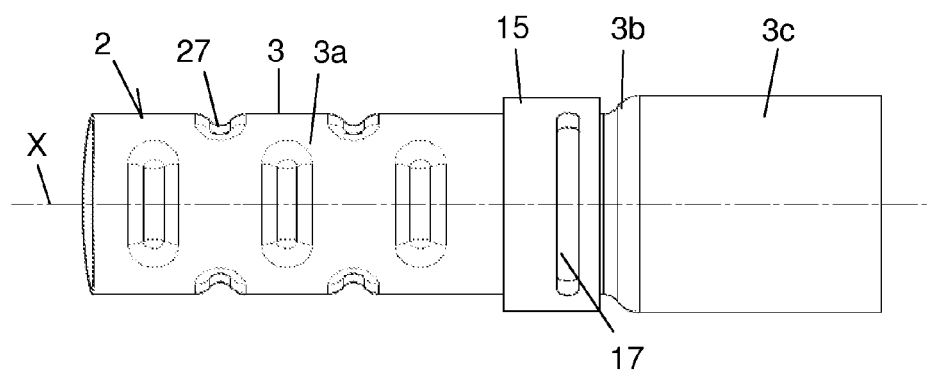
FIG. 2 is a side view of the absorber of FIG. 1.

In the depicted variant, the absorber is formed by a deformable tube 3 devoid of any perforation, which allows obtaining it by hydroforming, having a front sector 3a intended to be deformed when subjected to a compressive force; a short intermediate transition sector 3b; and a rear sector 3c having greater width than the previous sector (see FIG. 2).

In the depicted variant, the deformable tube 3 is provided with a series of oblong recesses 27 in a direction transverse to the deformable tube 3 and regularly distributed along the tube in a staggered arrangement.

Figure 3:
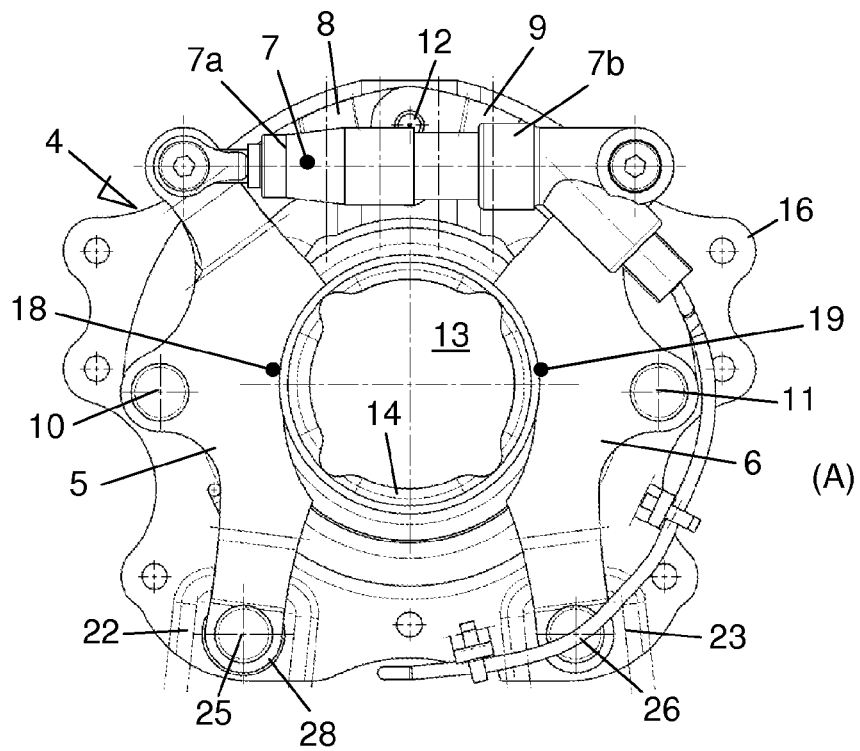
FIGS. 3 and 4 are respective front views of the retaining device, devoid of the supporting plate, in blocking and releasing positions, respectively.

Unlike the known systems, the retaining portion of the absorber 2 is made up of an outer ring 15 outside the deformable tube 3 having at least two slits 17 (being only one of them visible in FIGS. 1 and 2) transverse to the deformable tube 3 in which respective retaining portions 18 and 19 formed in the inner edge of the connecting rods 5, 6 are tightly inserted when the retaining device adopts the blocking position, which is depicted in FIGS. 1 and 3.

The end of the absorber 2 opposite to that which is joined to the element which acts as a bumper is preferably coupled in the mouth of a beam of the vehicle (not depicted) and the retaining device 4 comprises a pipe 20 in the shape of a truncated cone or the like which is introduced into the beam and guides the displacement of the absorber 2 in the direction of introduction into the beam when its displacement is allowed, a situation which is explained below.

The operation of the system 1 is as follows:

The retaining device 4 naturally adopts its blocking position (A) which is depicted in FIGS. 1 and 3. In this position, the inner edges of the connecting rods 5 and 6 having a contour similar to that of the deformable tube 3 are inserted into the slits 17 of the outer ring 15 integral with the deformable tube 3. To avoid unwanted looseness that can result in vibrations or noises, the connecting rods 5 and 6 of the retaining device 4 are subjected to the action of elastic means provided by torsion springs 28 which tend to arrange them in this blocking position (A).

From this position, in the event of a collision without the sensing means generating an electrical signal for activating the electromechanical transducer 7, the mechanism of the retaining device 4 will not change its position and the deformable tube 3, subjected to a compression force, will deform due to the effect of the backward movement of the bumper towards the inside of the vehicle. In order for the connecting rods 5 and 6 to be able to withstand the thrust force which tends to displace the deformable tube 3 towards the inside of the beam and in order for the deformable tube to not bend into an unwanted shape, the interference between each connecting rod 5 and 6 and the outer ring 15 must be adequate. In the depicted variant, each connecting rod spans an angle $\alpha$ of approximately 85°. The flat bar 16 is further pressed along the contour of the opening 13 in the direction towards the connecting rods 5 and 6 to form a supporting plane 14 thereof to aid in withstanding the thrust of the deformable tube 3.

Figure 4:
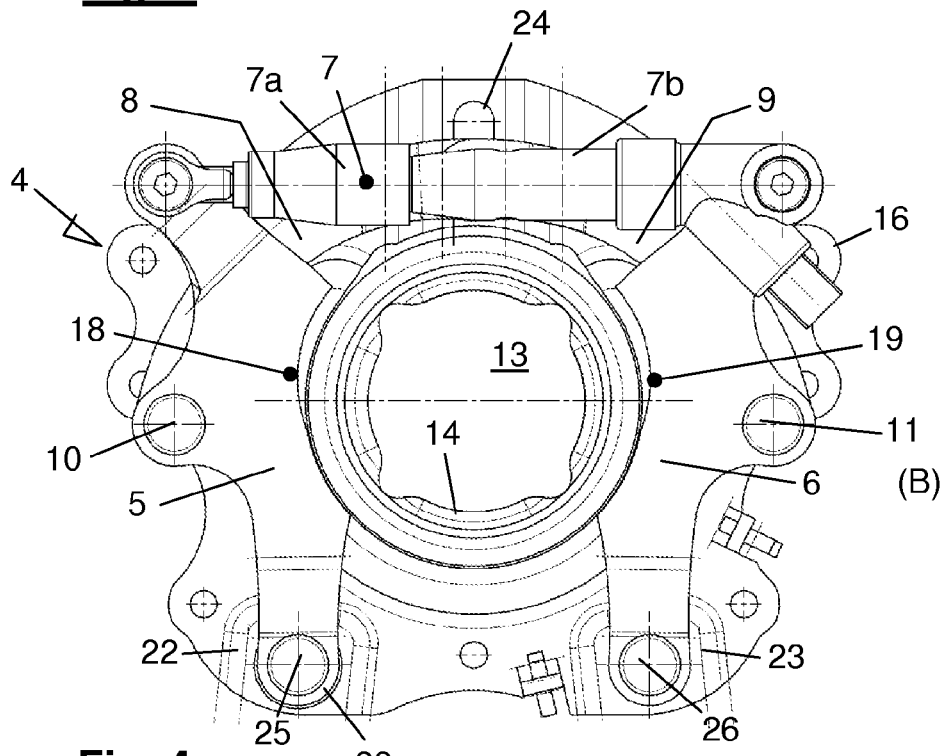

In the event of a collision which causes the sensing means to generate an electrical signal for activating the electromechanical transducer 7, an expansion thereof will occur almost instantaneously which, in the depicted example, translates into a relative movement between the piston 7b and the cylinder 7a, causing the simultaneous rotation of the connecting rods 5 and 6 until the retaining device 4 adopts the releasing position (B) depicted in FIG. 4.

In this position, the deformable tube 3 can be displaced towards the inside of the beam, the bumper of the vehicle sinking back without resistance or with controlled resistance, to cause the least damage possible to the pedestrian.

The invention claimed is:

1. A shock absorbing system applicable to the bumper of a vehicle, comprising:
    a shock absorber comprising a deformable tube having one end joined to the bumper, and
    a retaining device of the absorber supported by a vehicle chassis, comprising a retaining mechanism susceptible to adopting at least one blocking position and one releasing position in which the retaining mechanism prevents and allows, respectively, the displacement of a retaining portion of the absorber in an axial direction with respect to the chassis in the event of a vehicle collision, wherein the retaining mechanism comprises
    two rotating retaining connecting rods symmetrically arranged around the deformable tube, connected to a common support and linked to one another, wherein a rotation of a first one of the connecting rods is transmitted to a second one of the connecting rods to achieve a similar movement but in an opposite direction, the connecting rods being able to rotate from a blocking position in which they interfere in the path of the absorber preventing the displacement of the retaining portion in the axial direction to a releasing position in which the connecting rods allow the displacement of the absorber with respect to the retaining device and consequently with respect to the chassis; and
    an electromechanical transducer transforming an electrical signal into a mechanical impulse, the electromechanical transducer connected to the retaining connecting rods so as to transmit a force that actuates the retaining connecting rods, when a predetermined electrical signal is received by the electromechanical transducer, an impulse sufficient to displace the retaining connecting rods from the at least one blocking position to the at least one releasing position almost instantaneously.

2. The system according to claim 1, wherein the retaining mechanism comprises a first bar and a second bar respectively joined to the connecting rods by a first and a second articulated joints, said first and second bars in turn being joined to one another by a third articulated joint, the displacement of which is guided by a slide.

3. The system according to claim 2, wherein the first and the second articulated joints for joining the first and second bars and the corresponding connecting rods are essentially located diametrically opposite with respect to the deformable tube when said connecting rods adopt the blocking position.

4. The system according to claim 1, wherein the connecting rods of the retaining device are subjected to the action of elastic means which tend to arrange them in the blocking position.

5. The system according to claim 1, wherein the electromechanical transducer is any one of:
    a pyrotechnic actuator; or
    a magnetorheological actuator.

6. The system according to claim 1, wherein the electromechanical transducer comprises a cylinder and piston assembly, of which the cylinder is joined in an articulated manner to one of the connecting rods and the piston is joined in an articulated manner to the other one of the connecting rods.

7. The system according to claim 1, wherein the common support of the connecting rods is formed by a flat bar provided with an opening which is traversed by the deformable tube, said flat bar being pressed along the contour of the opening in the direction of the connecting rods to form a supporting plane thereof.

8. The system according to claim 1, wherein the retaining portion of the absorber is made up of an outer ring outside the deformable tube having at least two slits transverse to the deformable tube in which respective retaining portions formed in an inner edge of the connecting rods are tightly inserted.

9. The system according to claim 8, wherein the retaining portions formed in the inner edges of the connecting rods have a circular arc contour, and an interference between each of the connecting rods and the outer ring spans an angle $\alpha$ between 40° and 90°.

10. The system according to claim 1, wherein a second end of the absorber, opposite to the one end of the absorber, is disposed in a mouth of a beam of the vehicle.

11. The system according to claim 10, wherein the retaining device comprises a pipe which is introduced in the beam and which guides the displacement of the absorber in the direction of introduction into the beam.

12. The system according to claim 11, wherein the pipe is in the shape of a truncated cone.

13. The system according to claim 1, wherein the deformable tube is obtained by hydroforming and is devoid of any perforations.

14. The system according to claim 1, wherein the deformable tube has a front sector configured to be deformed when subjected to a compressive force; an intermediate transition sector; and a rear sector coupled inside a beam of the vehicle and having a greater width than the intermediate transition sector.

15. The system according to claim 1, wherein the connecting rods rotate around different pivot points.

16. The system according to claim 1, wherein actuation of the transducer extends the transducer so as to force rotation off the connecting rods.

17. The system according to claim 1, wherein the two retaining connection rods are in a plane perpendicular to the longitudinal axis of the deformable tube.

18. A shock absorbing system for a bumper of a vehicle comprising:
- a shock absorber having a retaining portion and a deformable tube, and
- a retaining device of the absorber having a retaining mechanism susceptible to adopting at least one blocking position and one releasing position in which the retaining mechanism prevents and allows, respectively, the displacement of the retaining portion of the absorber in an axial direction, the retaining mechanism further including:
  two rotating retaining connecting rods in a plane perpendicular to the longitudinal axis of the deformable tube and symmetrically arranged around the deformable tube, wherein the connecting rods are connected to a common support and linked to one another by a transducer, a rotation of any one of the connecting rods is transmitted to the other connecting rod to rotate the other connecting rod in an opposite direction, and the connecting rods are configured to rotate from a blocking position in which the connecting rods interfere in the path of the absorber preventing the displacement of retaining portion of the absorber in the axial direction to a releasing position in which the connecting rods allow the displacement of the absorber with respect to the retaining device, wherein an actuation of the transducer rotates the connecting rods.

* * * * *